Sept. 5, 1967     B. B. LIPSKE     3,339,788
CONTAINER
Filed Oct. 22, 1965     3 Sheets-Sheet 1
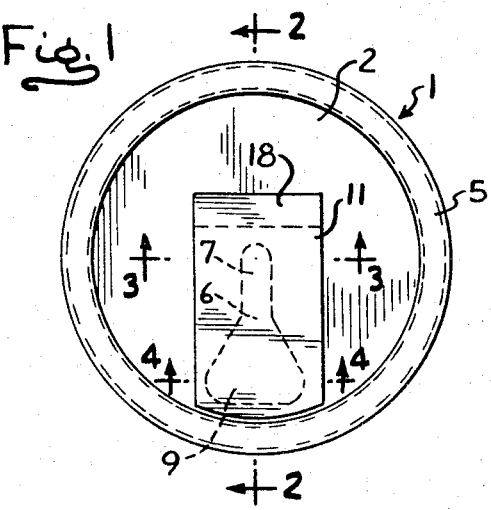
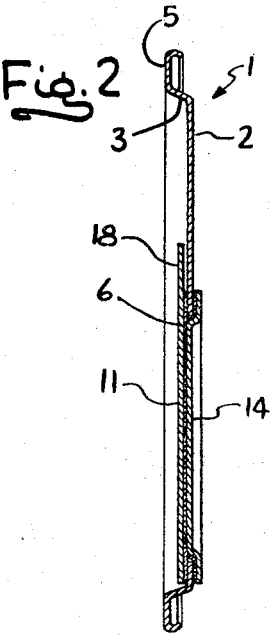
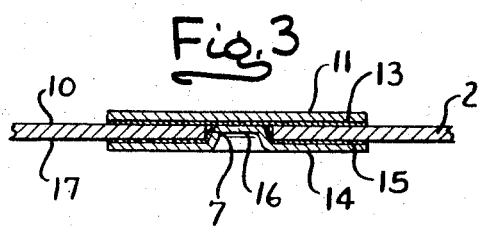
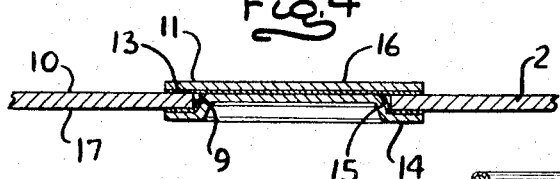
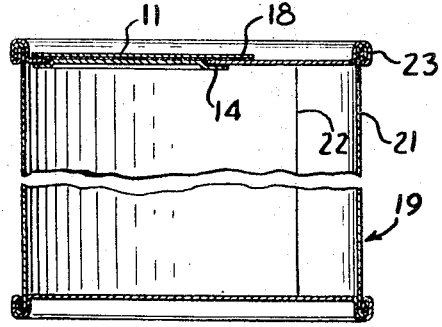
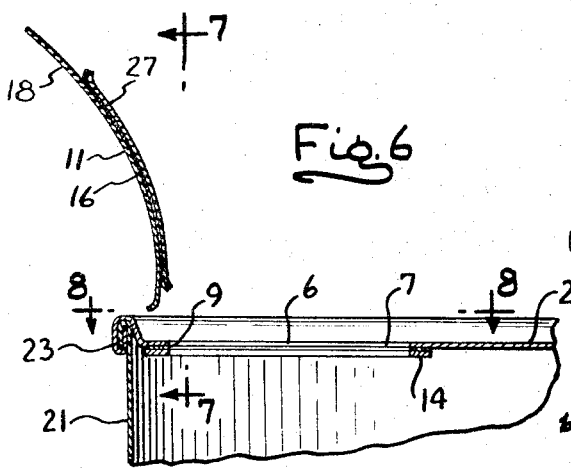
INVENTOR
BENJAMIN B. LIPSKE
by: Morris Spector
ATTY.

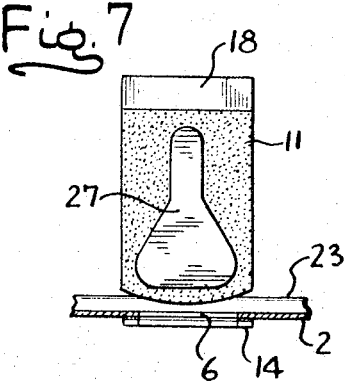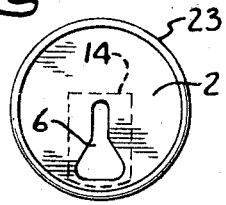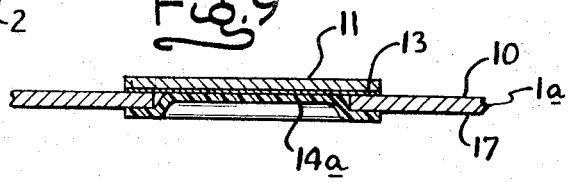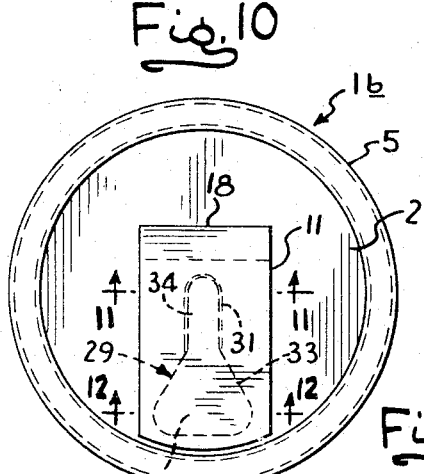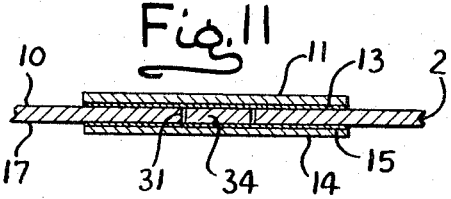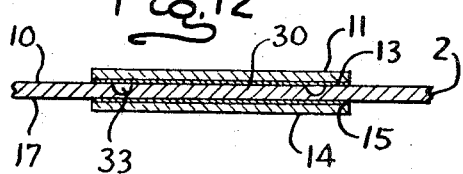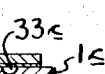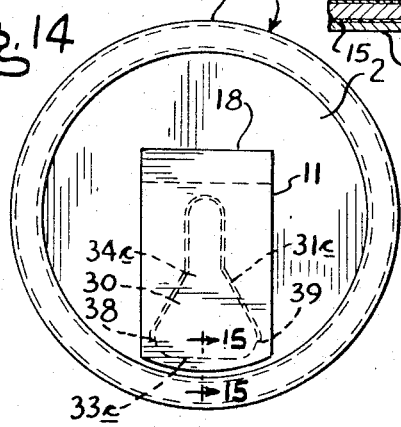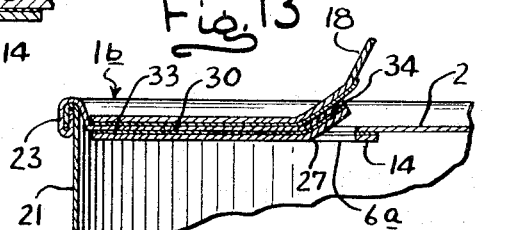

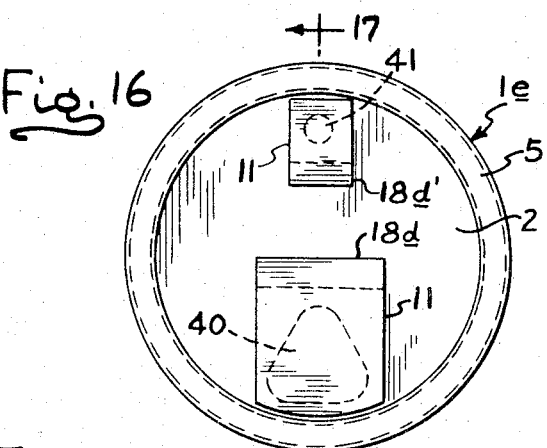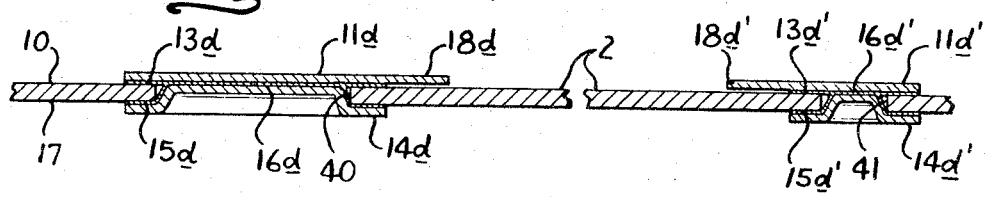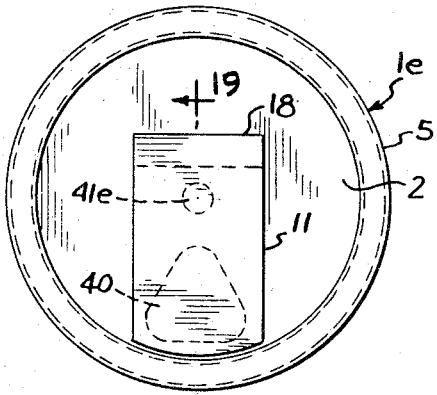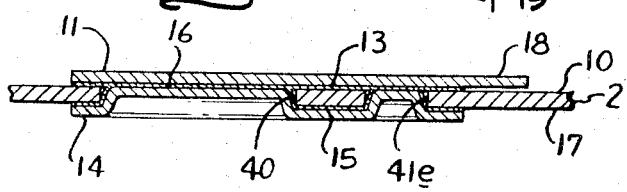

United States Patent Office 3,339,788
Patented Sept. 5, 1967

3,339,788
CONTAINER
Benjamin B. Lipske, Downers Grove, Ill., assignor to National Can Corporation, Chicago, Ill., a corporation of Delaware
Filed Oct. 22, 1965, Ser. No. 501,117
10 Claims. (Cl. 220—53)

This application is a continuation in part of my copending application Ser. No. 378,166, filed June 26, 1964, and relates to containers, more particularly to cans that may be opened without the use of an opening tool.

It is an object of the present invention to provide a can in which the can end has an opening therein hermetically sealed by foil or plastic tapes bonded to the inside and outside of the can end and with the tapes bonded to each other at the opening so that the tape on the outside of the can end may be torn therefrom to tear with it the part of the other tape bonded thereto, thereby to open the can.

It is another object of the present invention to provide a can of the type stated in which the inner tape covers the raw edge of metal at the opening to prevent contact therewith by the product within the can.

It is a further object of the present invention to provide a can of the type stated which is suitable for use in packaging products requiring an enamel lined can since the bonding of the tapes to the can end does not impair the enamel lining.

It is also an object of the present invention to provide a can in which the can end has a line of weakness defining a section of the can end that may be torn to form an opening, which may be a pour opening, vent opening, or a combined pour and vent opening. Part of the line of weakness is a score in the can end and another part is a slit or perforation through the can end that constitutes a tear initiating tab. A tape is bonded to the outside surface of the can end over the tab and slit to form an hermetic seal across the slit. When it is desired to open the can, the tape may be partially torn from the can end to lift the tab out of the plane of the can end so that the tab may be grasped to tear the remainder of the section from the can end to form the opening. A tape may also be bonded to the inside surface of the can end over the tab and slit, and this tape will be torn substantially along the line of weakness when the section is torn from the can end with the torn part of the tape remaining adhered to the section.

The attainment of the above and further objects of the present invention will be apparent from the following specification taken in conjunction with the accompanying drawing forming a part thereof.

In the drawing:

FIG. 1 is a top plan view of a can end constructed in accordance with and embodying the present invention;

FIG. 2 is a sectional view taken along line 2—2 of FIG. 1;

FIGS. 3 and 4 are fragmentary sectional views taken along line 3—3 and 4—4 respectively of FIG. 1;

FIG. 5 is a sectional view taken along the central axis of a can having secured thereto the can end of FIG. 1;

FIG. 6 is an enlarged fragmentary sectional view of a portion of FIG. 5 and showing the can opened;

FIG. 7 is a fragmentary sectional view taken along line 7—7 of FIG. 6;

FIG. 8 is a top plan view of the open can as seen from line 8—8 of FIG. 6;

FIG. 9 is a fragmentary sectional view similar to FIG. 4 and showing a modified form of the present invention;

FIG. 10 is a top plan view of a can end and showing another modified form of the present invention;

FIGS. 11 and 12 are fragmentary sectional views taken along lines 11—11 and 12—12 respectively of FIG. 10;

FIG. 13 is a fragmentary sectional view of the can end of FIGS. 10-12 secured to a can body and showing the manner of opening the can;

FIG. 14 is a top plan view of another modified form of can end;

FIG. 15 is a fragmentary sectional view taken along line 15—15 of FIG. 13;

FIG. 16 is a top plan view of another modified form of can end;

FIG. 17 is a fragmentary sectional view taken along line 17—17 of FIG. 16;

FIG. 18 is a top plan view of another modified form of can end; and

FIG. 19 is a fragmentary sectional view taken along line 19—19 of FIG. 18.

Like reference numerals indicate like parts throughout the drawing.

Referring now in more detail to the drawing. 1 designates a can end of sheet metal, for example tinplate or soft aluminum. The can end integrally includes a circular disc 2 which is surrounded by a generally conical wall 3, and the radially outer end of the wall 3 has a peripheral flange 5 through which the can end may be seam sealed in the usual manner to a can body.

The disc 2 is perforated to provide an opening 6 that extends from approximately the center of the disc radially outwardly to the region adjacent to the wall 3. The opening 6 includes a narrow radially inner vent slot 7 and a generally triangularly shaped radially outer pour out opening 9. Bonded over the outside surface 10 of the disc 2 and covering the opening 6 is a tape 11, such as aluminum or tinplate foil. The tape 11 has a surface area somewhat greater than that of the opening 6. The tape 11 is preferably of a type that is pre-coated with a layer of adhesive 13 which may, by way of example, by a polyester resin or other thermoplastic adhesive. A similar foil tape 14, somewhat shorter in length than the tape 11 and having a layer of adhesive 15, is bonded to the inside surface 17 of the disc 2 and covers the opening 6.

In fabricating the can end 1, the two foil tapes 11, 14 may be placed against the outer and inner disc surfaces 10, 17 with the adhesive layers 13, 15 adjacent to those surfaces 10, 17 whereupon heat and pressure may be applied to the tapes to bond them in place and form an hermetic seal over the opening 6. The tapes 11, 14 are, therefore, each bonded to one side of the disc 2 throughout localized areas that completely surround the opening and cover the opening, but these localized areas are substantially less than the total area of the disc 2. Furthermore, the two facing adhesive layers 13, 15 cause the tapes to become bonded to each other throughout an area 16 that is substantially coextensive with the opening 6. The tape 11 has a tab or flap 18 which is adjacent to the radially inner end of the vent opening 7 and which is left unbonded to the surface 10, as by omitting the application of heat and pressure thereto during the tape-bonding operation, and for purposes presently more fully appearing.

The can end 1 may be applied to a can body 19 as shown in FIGS. 5 and 6. The can body 19 may be made in a covnentional manner and comprise a cylindrical body wall 21 that is formed of a rectangular sheet of metal, the usual metals being tinplate, blackplate, or aluminum, with two opposed ends of the sheet overlapped and solder sealed together to form a longitudinal body seam 22. The peripheral flange 5 of the can end 1 is secured to the end of the body wall 21 in the conventional manner by a roll seam 23. Likewise, a conventional can end 25 may be secured to the other end of the body wall 21 by a roll seam 26.

When it is desired to open the can, the flap or tab 18 is grasped and pulled in a generally radial direction relative to the disc 2 to tear the tape 11 from the surface 10. Tearing of the tape 11 from the surface 10 also tears the inside tape 14 along a line that is substantially coincident with the raw edge of metal that defines the opening 6. The torn portion 27 of the tape 14 (FIGS. 6 and 7) remains adhered to the tape 11 and is substantially congruent to the opening 6. The remainder of the tape 14 stays within the can, remaining bonded to the surface 17.

FIG. 9 shows a modified form of can end 1a which is similar to the can end 1 previously described. However, in the can end 1a the inside tape 14a a entirely of plastic, for example a polyester resin. A tape of this kind may be used where the product within the can should not come in contact with metal, as is enamel lined cans.

In FIGS. 10–13 a line of weakness 29 defines a section 30 of the disc 2 that is of the same shape as the opening that will ultimately be formed when the can is opened. The line of weakness 29 is formed by a perforation in the disc such as a U-shaped slit or cut 31 through the disc over a tear initiating tab 34 of the section 30. The slit 31 may extend over all or a part of the narrower portion of the section 30. The remainder of the line of weakness 29 is a score 33 in the disc 2. It should be noted that the slit 31 is shown exaggerated as a double broken line in FIG. 10 for purposes of clarity of illustration.

The tapes 11, 14 are bonded over the section 30 and therebeyond and thus form an hermetic seal over the perforation 31 in the disc 2. The tapes 11, 14 may cover the entire section 30, as shown. Furthermore, the tape 14 may be either adhesive coated foil or entirely of plastic.

When it is desired to open the can, as shown in FIG. 13, the flap 18 is grasped to pull the tape 11 away from the disc surface 10. Since the tab 34 remains bonded to the tape 11, the tab 34 will be bent upwardly and out of the plane of the disc 2, and at the same time the inner tape 14 will be torn along the cut 31 with the torn part 27 of the tape 14 remaining bonded to the inside of the tab 34. With the tab 34 upstanding it may be grasped to tear the remainder of the section 30 from the disc 2 along the score line 33 to form the opening 6b. The torn section 30, the adhered thereto tape part 27, and the outside tape 11 are all bonded together and may be discarded together without torn portions of any of them falling back into the can. In some instances where there is no objection to the contents in the can coming in contact with the raw edges of metal at the slit 31, the inside tape 14 may be eliminated.

The embodiment of the invention shown in FIGS. 14 and 15 is the same as that shown in FIGS. 10–13 except that the can end 1c has the line of slit 31c that defines the tear initiating tab 34c extending into two radially outwardly diverging sides of the section 30 with the slit 31 terminating at points 38, 39 approximately at the widest part of the section 30. This provides a tab 34c which is somewhat longer than the tab 34 and a score line 33c which is a short peripheral part of the section 30.

FIGS. 16 and 17 show a can end 1a which is similar to the can end 1, previously described except that there are two opposed holes 40, 41 adjacent to the periphery of the disc 2 and which constitute the pour out opening and vent, respectively, with the pour out opening 40 being somewhat larger than the vent opening 41. Two tapes 11d, 14d, with adhesive coatings 13d, 15d, each similar to the tapes 11, 14, are bonded over the generally triangular pour out opening 40 and a similar pair of tapes 11d', 14d' having adhesive coatings 13d' 15d' are bonded over the circular vent opening 41. Like the tapes 11, 14, the tapes 11d, 14d, 11d', 14d' of the respective pairs are bonded to to the adjacent surfaces 10, 17 of the disc 2 and to each other at 16d, 16d' through the holes 40, 41. Each pair of tapes is torn from across the holes 40, 41 in the same manner as the tapes 11, 14 are torn from across the opening 6.

The can end 1e of FIGS. 18 and 19 is similar to that shown in FIGS. 16 and 17 except that the vent hole 41e is approximately at the center of the disc 2. The tapes 11, 14 extend across both holes 40, 41e, which are opened by a single tape-tearing operation.

In another embodiment of the invention, any of the inside tapes 14 shown in FIGS. 3–6, 10–15 and 19, and the tapes 14d, 14d' may be replaced with a plastisol material which serves to prevent contact between any product or product vapors and any raw metal edges which may be present by reason of the provision for the opening or openings in the can end. For instance, in FIGS. 3–5 no inner tape 14 need be provided over the opening 6 because the tape 11 attached to the exterior of the can end 1 is of sufficient strength to hold the desired pressure or vacuum. The plastisol is applied in substantially the same place and in the same manner as is indicated for the inner tape 14 shown in FIGS. 3 and 4, or in a manner similar to that shown for the plastic tape 14a shown in FIG. 9.

In one embodiment which is used with conventional beer cans, an exterior, tinplated steel foil outer tape is adhered to the can end, and a plastisol seal member is attached to the inside of the can end covering the exterior foil tape in an area somewhat greater than that provided by the opening 6. When the metal foil tear tape is removed from the exterior of the end, that portion of the plastisol which is adhered to the foil tape remains attached thereto, and that portion of the plastisol which is attached to the can end remains attached to the end. There the tinplated steel foil of approximately 0.003 inch thickness is preferred, such steel foil having a so-called 0.25 lb. coating thereon, that is, a coating of one-quarter pound of tin for every "base box" of foil, that is, one-quarter pound of tin covers an area of 435.56 square feet of foil (both sides of 112 sheets of foil each measuring 14 inches by 20 inches). Other thicknesses of exterior metal foils are known, and some metal foils may be as thin at 0.00075 inch or thinner, whereas other products may require the use of steel or aluminum foils of thicknesses of 0.005 inch or more.

The inside surface of the foil tear tape is coated with modified vinyl primer, and then treated with a heat-tackifying thermoplastic adhesive, preferably in the form of an acrylonitrile rubber formulation, modified by the addition of a vinyl chloride acetate copolymer, treated with suitable plasticizers to provide the desired flexibility and adhesion. The foil tape thus primed and treated with adhesive is attached to the can end, which also contains, on the exterior surface thereof, a modified vinyl primer.

The inside of the can end is coated with a modified vinyl base coat varnish, and a modified vinyl top coat. The plastisol material, which is also basically a vinyl chloride-acetate copolymer suitably plasticized by the addition of an FDA approved plasticizer, such as dicyclohexyl-phthlate or the like, is deposited over the modified vinyl top coat on the interior of the end and cured in a manner well known to those skilled in the art.

Other exterior and interior coatings, as well as other adhesive systems are well known to those skilled in the art. Thus, a suitable adhesive may be selected and adopted for use with the present invention, its characteristics depending upon both the types of metal finishes used, and the degree of adhesion required to satisfy the pressure or vacuum holding conditions to be imposed on finished container. However, the system described immediately above, in which all the coatings and adhesives comprise forms of vinyl chloride or modified vinyl chloride operates best, especially in view of the heat-tackifying nature of the adhesives, and in view of the manner of curing the plastisol into a rubbery mass by application of heat thereto.

The exact formulation of the plastisol is not critical and may be varied to accommodate the requirements of any given container. A number of suitable plastisols are known to those skilled in the art, and such plastisols may be of a clear or milky color, or may be a relatively opaque grey or dark red color. Many such plastisols are commonly known and are used today as interior liners or seal members for crown caps, glass jar covers, and the like.

The can end of the type which includes the plastisol inner seal, referred to above, may be made by the process of heat-sealing the exterior tape to the exterior of the can end with heat and pressure, depositing a metered quantity of plastisol on the inside of the can end in the area of the opening or openings covered by the exterior foil tear tape, and thereafter moving a heated die down into contact with the plastisol to cause it to assume the desired configuration, and then curing the plastisol by the application of additional heat, such as by placing it in a conventional curing oven or the like. The amount of plastisol deposited should be such as to provide a coating that covers fully the edge of can end metal around the opening or openings, as well as the adjacent inside surfaces of the can end and foil tape. Typically, the plastisol coating may be of the order of .005 to .010 inch thicker than the thickness of the metal of the can end where the opening is cut. For example, in a can end having a thickness of .010 inch where the hole is cut, the plastisol coating may be about .015 to .020 inch. This allows for the fact that there is about .003 to .004 inch at the edge of the hole at which the metal is burred or inturned when the holes are stamped in the can ends, and insures that the coating is sufficiently thick to cover the burred edge.

It is not stricly necessary, in accordance with the present invention, to cover the entire inside of the tear tape with plastisol, provided that there is no objection to contact between the tape and the contents of the can, but because of the fluid nature of the plastisol during the time it is applied to the end, the plastisol normally covers that entire portion of the tape which is exposed on the inside of the can, as well as that portion of the can end immediately surrounding the opening, leaving a margin, for example, of about one-quarter of an inch outwardly from such edge portions.

Another embodiment of the invention which is substantially identical to those referred to above is one which is made in the same way but in which the exterior seal member is a steel foil of about .0025 inch to .00085 inch in thickness. In such a case, the steel foil will not hold as much pressure as can be retained by thicker steel or aluminum foils but such a seal has the desired advantage of dual method of operation, that is, when a thin steel foil cover is placed on a large capacity can, for example, a beer can of one-half gallon, or comparable size including one gallon, it will hold as much pressure as that to which the can is normally subjected, but at the same time such seal can be easliy punctured through without a necessity for removing it. Thus, a recent marketing concept in the beer industry utilizes, for example, a one-gallon beer can to which a dispensing device which includes a tap rod is removably attached to the can. With a seal member of the type referred to just above, the consumer may have a choice between removing the foil seal member by pulling on the tape portion thereof, or, in the alternative, he may leave the seal in place and force the metal or plastic tape rod through the seal member without removing the same. Thus, any foil of about .0005 inch to about .001 inch thickness may be suitable for combining the advantages of pressure retention, puncturability and ready removal.

In other cases foils of greater thickness, such as .004 inch to .006 inch thickness or greater, may be desired, as for example, it is anticipated that the container will be subjected to rough handling, or in the event that a relatively large opening is required to be spanned and where the extra strength provided by such thicker foil is desired.

A typical plastisol material I have found suitable for use in this invention comprises a vinyl chloride resin, or vinyl chloride resin copolymerized with small amounts, say, 5% or less, of vinyl acetate and/or vinyl alcohol. These resins are insoluble in, but dispersable in typical plasticizers, such as dioctyl phthalate, dioctyl sebacate, diphenyl phosphate, tricresyl phosphate and the like. After the resin is dispersed in the plasticizer, it may be cured, as by heating 350° F. or more, whereupon solvation of the resinous component takes place, and the resulting cured composition is in the form of a solvated plastic, that is, an organic glass, solid solution, or ultra-high viscosity fluid, being somewhat flexible, and having excellent adhesion to the primers or inner end coatings referred to above.

The vinyl coating referred to herein as a modified vinyl coating is a vinyl chloride resin to which have been added relatively smaller amounts of additional resins, phenolics (phenol-formaldehydes) expoxies, epoxy polyesters or polyethers, or combinations of epoxies and phenolics. Thus, modifying a thermoplastic vinyl resin by the addition of such thermosetting resins desirably increases the adhesion obtainable with the vinyl resins.

In compliance with the requirements of the patent statutes I have herein shown and described a preferred embodiment of the invention. It is, however, to be understood that the invention is not limited to the precise construction herein shown, the same being merely illustrative of the principles of the invention.

What is considered new and sought to be secured by Letters Patent is:

1. A container wall member having an opening, and removable means for covering the opening, said means comprising a gas impermeable metal foil seal member on the exterior surface of said wall member and covering said opening, adhesive means removably securing the foil seal to the exterior surface of the wall member; said adhesive means comprising a coating on the foil seal member and a coating on said exterior surface, each coating comprising a thermoplastic vinyl resin and a thermosetting resin, and a heat-tackifying thermoplastic layer between said coatings; and a seal coating of plastisol material spanning the margin of the opening throughout the extent thereof, said seal coating being bonded continuously adjacent to said margin to the interior surface of said wall member and the interior surface of the foil seal exposed through the opening and being of a thickness sufficiently greater than said wall member at said opening to cover completely said margin.

2. A can end comprising a disc having peripheral means for attachment to a can body, said disc being perforated inwardly of said peripheral means to provide an opening having an area that is less than the part of said disc inwardly of said peripheral means, and means for sealing said opening, said means comprising a gas impermeable metal foil seal member on the exterior surface of said disc and covering said opening, adhesive means removably securing the foil seal to one surface of the disc; said adhesive means comprising a coating on the foil seal member and a coating on said exterior surface, each coating comprising a thermoplastic vinyl resin and a thermosetting resin, and a heat-tackifying thermoplastic layer between said coatings; and a seal coating of plastisol material on the interior of said disc and spanning the margin of the opening throughout the extent thereof, said seal coating being bonded continuously adjacent to said margin to the interior surface of said disc and the surface of the foil seal exposed through said opening and being of a thickness sufficiently greater than the disc at said opening to cover completely said margin, and a part of said foil being free of bond from said one surface and constituting a tab which may be grasped to remove the foil from across said opening whereby the plastisol is torn and the portion of the plastisol that is adhered to the foil remains adhered thereto and the portion of the plastisol that is adhered to said opposite surface of the disc remains adhered thereto.

3. A can end according to claim 2 in which said plastisol comprises a heat-curable vinyl resin.

4. A can end according to claim 1 in which the plastisol covers completely the surface portion of the foil seal that is exposed through said opening.

5. A can end as defined in claim 1 in which said exterior metal foil seal member comprises a foil of from about .0005 inch to .001 inch in thickness.

6. A can end as defined in claim 1 in which said exterior metal foil seal member comprises a metal foil of a thickness between about .005 inch and .006 inch.

7. A can end as defined in claim 1 in which said exterior metal foil seal member comprises a foil of from about .0015 inch to .003 inch in thickness.

8. A can end comprising a disc having inner and outer surfaces and peripheral means for attachment to a can body, said disc being perforated inwardly of said peripheral means to provide an opening having an area that is less than the area of the disc inwardly of said peripheral means, a gas impermeable metal foil-containing member adhesively secured to said outer surface and sealing said opening, said inner surface being coated with a vinyl base coat and a vinyl top coat over the base coat and with said base coat being modified by a thermosetting resin, and a coating of a vinyl plastisol material deposited on said top coat and onto the part of the foil-containing member that is exposed through said opening, said plastisol spanning the edge that defines said opening throughout the extent of said edge and being of a thickness sufficient to cover said edge completely.

9. A can end according to claim 8 in which the foil-containing member has a coating of thermoplastic adhesive by which the member is secured to said outer surface and said outside surface is coated with a vinyl resin.

10. A can end as defined in claim 8 in which said opening includes a burr thereon on said inner surface thereof in the area defining said opening therein, said burr being adapted to aid in cutting said plastisol cleanly when said metal foil-containing member is removed from said can end, while said plastisol is adhered to said foil-containing member.

References Cited

UNITED STATES PATENTS

| 2,147,004 | 2/1939 | Wark et al. | 220—47 |
| 2,629,534 | 2/1953 | Reynolds | 229—3.5 |
| 2,719,647 | 10/1955 | Freeman | 220—53 |
| 2,870,935 | 1/1959 | Houghtelling | 220—53 |
| 3,101,879 | 8/1963 | Meyer et al. | 229—7 |
| 3,186,581 | 6/1965 | Schneider et al. | 220—53 |
| 3,251,515 | 5/1966 | Henchert et al. | 220—53 |

FOREIGN PATENTS 989,808  3/1963  Great Britain.

THERON E. CONDON, *Primary Examiner.*

LOUIS G. MANCENE, *Examiner.*

G. T. HALL, *Assistant Examiner.*